United States Patent Office 2,773,813
Patented Dec. 11, 1956

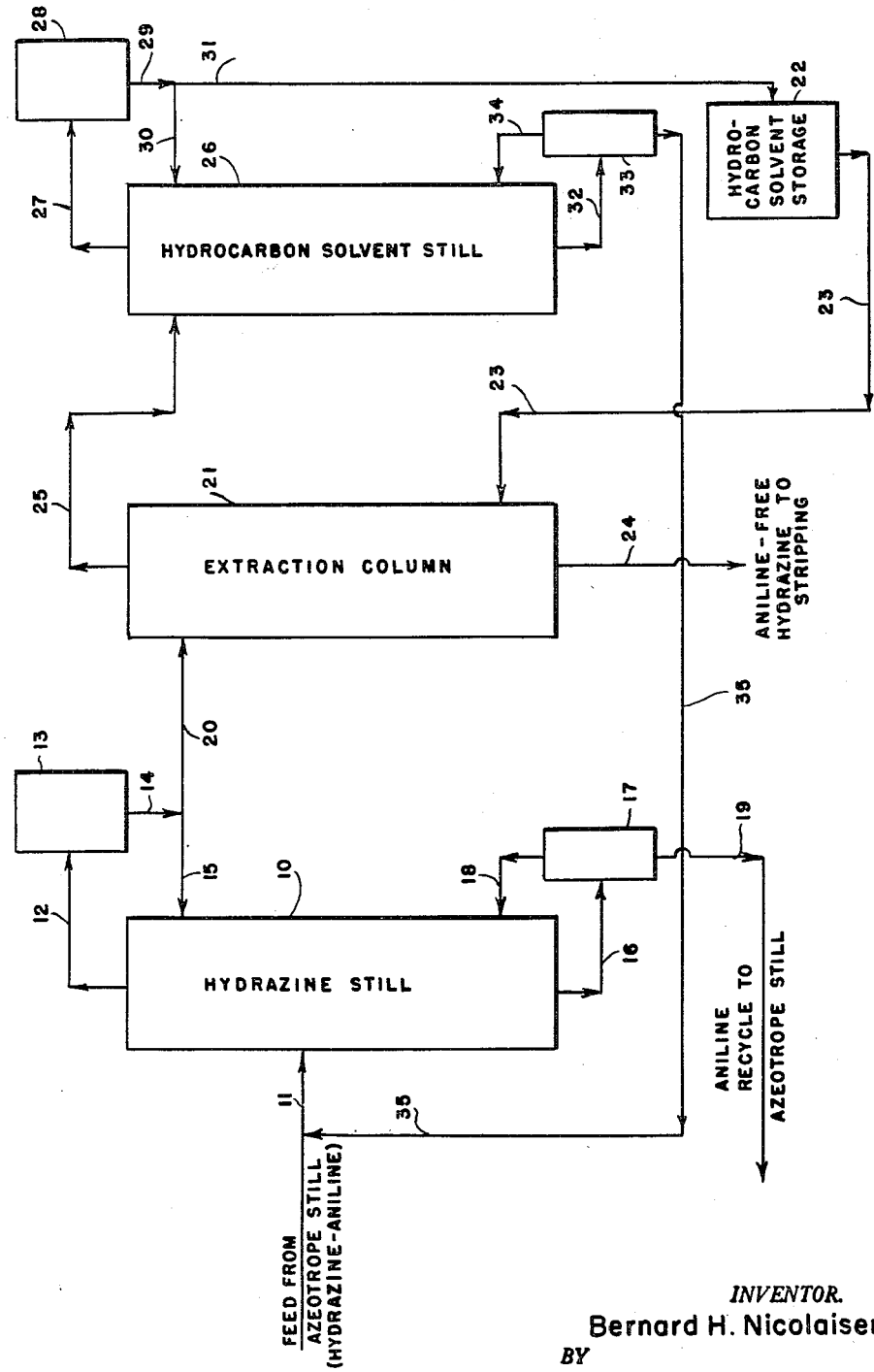

2,773,813

EXTRACTION OF ANILINE FROM HYDRAZINE IN THE DEHYDRATION OF HYDRAZINE BY AZEOTROPIC DISTILLATION

Bernard H. Nicolaisen, Kenmore, N. Y., assignor to Olin Mathieson Chemical Corporation, a corporation of Virginia Application June 12, 1953, Serial No. 361,184

4 Claims. (Cl. 202—42)

My invention relates to an improvement in the manufacture of anhydrous hydrazine and more particularly to the purification of anhydrous hydrazine products resulting from the dehydration of aqueous hydrazine solutions by azeotropic distillation with an entraining agent for water.

In the dehydration of aqueous solutions of hydrazine to produce anhydrous hydrazine, a dilute aqueous solution of hydrazine, such as that produced in the Raschig process commonly employed for hydrazine synthesis, is distilled at atmospheric pressure to remove water and concentrate the hydrazine content. Because hydrazine and water form an azeotrope having a composition of about 71% hydrazine–29% water, it is not possible to obtain any concentration of hydrazine beyond this point by atmospheric distillation. The hydrazine-water azeotrope, or somewhat more dilute aqueous solutions of hydrazine, is further concentrated with respect to hydrazine, and anhydrous hydrazine is produced, by azeotropic distillation of the aqueous hydrazine solution with an entraining agent which forms an azeotrope with water boiling at a temperature below the boiling point of the hydrazine-water azeotrope.

In practicing such azeotropic distillation, the somewhat concentrated aqueous hydrazine produced as a product of atmospheric distillation is charged to an azeotrope still with an entraining agent for water, such as aniline. From the azeotrope still, the aniline-water azeotrope is taken overhead and hydrazine-aniline bottoms are charged to a hydrazine still from which anhydrous hydrazine is removed overhead leaving aniline and a small proportion of hydrazine as bottoms. A particularly advantageous method of conducting this azeotropic distillation of hydrazine is described in my pending application, Serial No. 361,185, filed June 12, 1953.

In the operation of any azeotropic distillation for the dehydration of aqueous solutions of hydrazine using aniline as an entraining agent, minor proportions of aniline may be present in the anhydrous hydrazine product from the hydrazine still. For many purposes such small proportions of aniline in hydrazine are not objectionable, but for some uses it is desirable to have an anhydrous hydrazine completely free of any such contaminating aniline. The removal of aniline from aniline-contaminated anhydrous hydrazine such as is produced as overhead product of the hydrazine still presents a particular problem which my process has been designed to overcome in a manner such that the removal of the contaminating aniline may be integrated with the azeotropic distillation process to produce a substantially pure anhydrous hydrazine in a unitary operation.

The process of my invention provides a means for extracting minor proportions of aniline from aniline-contaminated anhydrous hydrazine using a selective hydrocarbon solvent for this purpose. I have found that an aniline-free anhydrous hydrazine can be produced from the aniline-contaminated anhydrous hydrazine taken as an overhead product from the hydrazine still by contacting the aniline-contaminated anhydrous hydrazine with a selective hydrocarbon solvent for aniline, separating a hydrazine phase and a hydrocarbon solvent phase, and stripping residual hydrocarbon solvent from the hydrazine phase.

According to my process, concentrated hydrazine, assaying 95% or higher in hydrazine content and containing minor proportions of aniline, such as may be obtained as an overhead product from the distillation of hydrazine-aniline mixtures in the hydrazine still, is extracted by means of a suitable selective hydrocarbon solvent to remove the aniline. With aniline as the contaminatnig material to be removed from the hydrazine, benzene is a particularly useful selective solvent, but other selective hydrocarbon solvents including cyclohexane, petroleum ether, butane or the like may be used. Butane and other equally volatile hydrocarbons are particularly advantageous in that the final stripping of the residual butane or other normally gaseous hydrocarbon solvent from the hydrazine is particularly easy as compared with the stripping of residual higher boiling hydrocarbon solvents from the hydrazine. In addition, the use of normally gaseous selective hydrocarbon solvents for aniline, such as butane, is advantageous because the hydrocarbon solvent-aniline extract, the hydrocarbon solvent phase, formed in the solvent extraction of the aniline-contaminated anhydrous hydrazine can be much more easily separated into its aniline and selective hydrocarbon solvent components than is possible when higher boiling hydrocarbon solvents are employed. The solvent extraction may be accomplished in a series of batch extraction stages or in a continuous manner employing an extraction column.

When an extraction column is employed in the practice of my process, the aniline-contaminated anhydrous hydrazine is introduced to the top of a packed column and the selective hydrocarbon solvent, for example, benzene, is introduced near the bottom. During the countercurrent flow through the extraction column, aniline passes from the hydrazine to the selective hydrocarbon solvent and a selective hydrocarbon solvent-aniline extract, the hydrocarbon solvent phase, is removed from the top of the extraction column.

The bottoms form the extraction column, the hydrazine phase, comprise anhydrous hydrazine which is almost completely aniline-free. The extent to which aniline is removed will depend upon both the efficiency of contact between the aniline-contaminated hydrazine feed and the selective hydrocarbon solvent and the relative quantity of selective hydrocarbon solvent contacted with the hydrazine feed.

When practicing my process in batchwise operation, several extraction stages may be required, the exact number depending on the aniline content of the hydrazine feed, the desired reduction in aniline content, the selective hydrocarbon solvent employed and the proportions of solvent to aniline-contaminated hydrazine feed employed. In batchwise operation, a mixture of aniline-contaminated hydrazine feed and a suitable selective hydrocarbon solvent for aniline in equal volume proportions, for example, although the proportions of hydrazine feed and hydrocarbon solvent may vary over a wide range, is agitated briefly, and then allowed to settle to effect a separation of the hydrazine phase and the hydrocarbon solvent phase. The hydrocarbon solvent phase containing dissolved aniline is then withdrawn and the hydrazine phase subjected to a further extraction stage, if necessary.

The bottoms from the extraction column or the hydrazine phase from the last batch extraction stage is stripped of the selective hydrocarbon solvent in any suitable manner to obtain the purified hydrazine product. Such stripping may take the form of heating to a suitable temperature to drive off residual hydrocarbon solvent. The use of normally gaseous hydrocarbon solvents is particularly advantageous in that this stripping operation is simplified to the extent that the residual hydrocarbon solvent may be stripped from the purified hydrazine by merely agitating the hydrazine to facilitate release of the residual normally gaseous solvent.

The selective hydrocarbon solvent-aniline extract, i. e., the effluent from the extraction column or the hydrocarbon solvent phase in batch extraction, is charged to a hydrocarbon solvent still and hydrocarbon solvent is removed as an overhead product to storage. It is recycled to solvent extraction for re-use as needed.

Aniline containing small amounts of hydrazine is removed from the bottom of the hydrocarbon solvent still and may with advantage be recycled to the hydrazine still of the azeotropic distillation process to recover this hydrazine content.

Temperature is not a critical factor in either manner of practicing my process and may be about room temperature or somewhat lower. Temperatures below about 100° C. are convenient. Pressures may range from atmospheric to about 125 p. s. i. g. Using butane, for example, at 30° C., pressures of about 50 p. s. i. g. are developed.

By the integration of the process of my invention with the azeotropic distillation process, the separation of aniline and hydrazine in the hydrazine still becomes substantially less critical. This is an important advantage of my process, for when my process is integrated with the azeotropic distillation process, the hydrazine still may be smaller or its throughput may be increased since the reflux ratio may be substantially reduced. Thus, a considerable economic advantage may be realized.

*Example I*

A mixture of 95.12% of hydrazine, 0.93% of aniline and 3.95% of water was extracted three times with an equal volume of benzene in each extraction. The mixture was agitated briefly and allowed to settle for 15 minutes after which the hydrazine phase and the benzene phase were separated. The original aniline content of the hydrazine charge was reduced in the successive extractions to 0.59, 0.37 and 0.24%. In these analyses the ultra-violet method was used.

The process of my invention will be further described in connection with the accompanying drawing which is a flow diagram of the process of my invention employing an extraction column integrated with the hydrazine still of the azeotropic distillation process.

In the drawing, the hydrazine still 10 represents the final stage of the production of anhydrous hydrazine by azeotropic distillation. A hydrazine-aniline feed mixture is charged through line 11 to this hydrazine still 10 from the azeotrope still (not shown) of the azeotropic distillation process. From the hydrazine still 10, anhydrous hydrazine containing a small amount of aniline is passed overhead through line 12 to condenser 13 from which a portion is returned to the still 10 as reflux through lines 14 and 15 while the remainder, usually withdrawn as an aniline-contaminated anhydrous hydrazine product, is charged to an extraction column 21 through lines 14 and 20. Bottoms from the hydrazine still 10 comprising aniline containing minor amounts of hydrazine leave the still 10 through line 16 passing to reboiler 17 which is suitably heated by steam coils or the like to vaporize a portion of the bottoms for return to the hydrazine still through line 18 to supply heat for the distillation. The remainder of these bottoms pass out of reboiler 17 through line 19 for recycle to the azeotrope still as a portion of the aniline necessary to effect dehydration of the dilute aqueous hydrazine solution starting material of the azeotropic distillation process. As described in my pending application, Serial No. 361,186, filed June 12, 1953, a portion of this recycle aniline passing to the azeotrope still is diverted with advantage to an aniline still in which the aniline is purified before return to the azeotrope still so as to maintain the concentration of nonvolatile impurities in the total aniline recycle stream below objectionable limits.

With the process of my invention integrated with the azeotropic distillation process, the aniline-contaminated anhydrous hydrazine product normally discharged from the condenser 13 as the product of azeotropic distillation is instead passed through lines 14 and 20 to the top of extraction column 21. A selective hydrocarbon solvent for the aniline, such as benzene, is introduced near the bottom of extraction column 21 from storage tank 22 through line 23. The aniline-contaminated hydrazine and the selective hydrocarbon solvent, such as benzene, pass in counter-current flow through the extraction column 21. During this counter-current flow, the aniline passes from the hydrazine to the selective hydrocarbon solvent and aniline-free anhydrous hydrazine leaves the extraction column 21 through line 24 after which it may be suitably stripped of any residual selective solvent. A hydrocarbon solvent-aniline extract passes out of the top of extraction column 21 through line 25 to a hydrocarbon solvent still 26 from which the hydrocarbon solvent passes overhead through line 27 to condenser 28. The liquefied hydrocarbon solvent leaves condenser 28 through line 29 and a portion is returned to hydrocarbon solvent still 26 through line 30 as reflux and the remainder passes through line 31 to hydrocarbon solvent storage tank 22. Aniline bottoms from the hydrocarbon solvent still 26 pass through line 32 to reboiler 33 suitably heated by steam coils or the like. From reboiler 33, a portion of the aniline bottoms are returned to the hydrocarbon still as vapors through line 34 to provide the heat requirements of distillation, and the remainder of the aniline bottoms, which may contain a minor amount of hydrazine, are recycled to hydrazine still 10 through line 35 in order to recover this contained hydrazine.

I claim:
1. In the production of anhydrous hydrazine by azeotropic distillation of aqueous hydrazine solutions employing analine as entraining agent for water comprising removing the water as a component of an aniline-water azeotrope to leave an anhydrous hydrazine-aniline mixture and separating an aniline-contaminated anhydrous hydrazine from this mixture, the improvement which comprises contacting the aniline-contaminated anhydrous hydrazine with a selective hydrocarbon solvent for aniline, separating a hydrazine phase and a hydrocarbon solvent phase, and stripping residual hydrocarbon solvent from the hydrazine phase.

2. The process of claim 1 in which benzene is employed as the selective hydrocarbon solvent.

3. The process of claim 1 in which a normally gaseous paraffinic hydrocarbon is employed as the selective hydrocarbon solvent.

4. The process of claim 1 in which butane is employed as the selective hydrocarbon solvent.

References Cited in the file of this patent

UNITED STATES PATENTS

| 2,385,504 | Goulding | Sept. 25, 1945 |
| 2,537,791 | Schwarcz | Jan. 9, 1951 |

FOREIGN PATENTS

| 620,713 | Great Britain | Mar. 29, 1949 |
| 652,855 | Great Britain | May 2, 1951 |

OTHER REFERENCES

The Chemistry of Hydrazine, by Audrieth and Ogg, 1951 (pages 42–53).